(12) United States Patent
Niimi et al.

(10) Patent No.: US 6,926,443 B2
(45) Date of Patent: Aug. 9, 2005

(54) SEAT SLIDE APPARATUS FOR A VEHICLE

(75) Inventors: Naoki Niimi, Kariya (JP); Hiroyuki Okazaki, Chiryu (JP); Shin Shiraki, Kakamigahara (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 35 days.

(21) Appl. No.: 10/682,414

(22) Filed: Oct. 10, 2003

(65) Prior Publication Data

US 2004/0131291 A1 Jul. 8, 2004

(30) Foreign Application Priority Data

Oct. 11, 2002 (JP) ....................................... 2002-299243

(51) Int. Cl.$^7$ .............................................. F16C 29/02
(52) U.S. Cl. ........................................ 384/34; 248/429
(58) Field of Search ............................. 384/34, 21, 41; 248/429

(56) References Cited

U.S. PATENT DOCUMENTS 5,806,825 A 9/1998 Couasnon

FOREIGN PATENT DOCUMENTS

| DE | 696 00 252 T | 6/1996 |
| FR | 2 768 670 A1 | 3/1999 |
| JP | 9-11781 A | 1/1997 |
| JP | 2001-158259 A | 6/2001 |

*Primary Examiner*—Lenard A Footland
(74) *Attorney, Agent, or Firm*—Burns, Doane, Swecker & Mathis, L.L.P.

(57) ABSTRACT

A seat slide apparatus for a vehicle includes a lower rail assembled to a vehicle seat, an upper rail slidably engaging with the corresponding upper rail for supporting the vehicle seat, a loop-shaped release handle supported by the upper rail on its end portion for releasing the engagement between the upper rail and the lower rail, and a bracket fixed to the upper rail for detachably supporting the release handle, an opening portion formed on the bracket allowing the end portion of the release handle to pass there through, and a flexible tongue formed on the bracket and adapted to be flexibly movable in vertical direction for engaging with a stopper piece provided at the end portion of the release handle. The current invention uses a technical device for detaching the end portion of the release handle from the bracket fixed to the upper rail for supporting the end portion of the release handle.

6 Claims, 4 Drawing Sheets

US 6,926,443 B2

SEAT SLIDE APPARATUS FOR A VEHICLE

This application is based on and claims priority under 35 U.S.C. §119 with respect to Japanese Application No. 2002-299243 filed on Oct. 11, 2002, the entire content of which is incorporated herein by reference.

FIELD OF THE INVENTION

This invention generally relates to a seat slide apparatus for a vehicle. More particularly, the present invention pertains to the seat slide apparatus for allowing a release handle to be detachable relative to an upper rail.

BACKGROUND OF THE INVENTION

A known seat slide apparatus for a vehicle is disclosed, for example, in Japanese Patent Laid-Open Publications No. 9-0011781 and No. 2001-158259 and in French Patent Publication No. 276870. The known seat slide apparatus for the vehicle includes at least a pair of lower rails provided away from each other in vehicle width direction and fixed on a vehicle floor, a pair of upper rails supporting a seat and being slidable relative to each corresponding lower rails, and a loop-shaped release handle for releasing locked condition of the upper rail on the lower rail.

Generally, the upper rail is locked by a pawl of a pawl portion which is rotatably supported by the upper rail engaging with a corresponding recess on the lower rail. The release handle rotates the pawl portion, more specifically, when the release handle is operated, the pawl portion rotates, as a result, the pawl disengages from the recess for allowing the upper rail to slide on the lower rail.

An end portion of the loop-shaped release handle is supported by a bracket fixed on the upper rail, and the end portion of the loop-shaped release handle is cooperatable with the pawl member. The loop-shaped release handle is operated by a passenger griping and moving the front portion of the release handle in vertical direction.

When one of rails needs to be replaced due to some sort of reason during a vehicle seat assembling process or after the vehicle is purchased, both a sub-unit including the upper and lower rails and the loop-shaped release handle has been replaced as one unit because each end portions of the loop-shaped release handles are fixed to the upper rails and not able to be removed from the upper rails.

It is uneconomical that replacing the unit including the upper and lower rails and the release handle because the unit still contains usable components.

Thus, the purpose of the invention is resolving these aforementioned problems of the known invention.

SUMMARY OF THE INVENTION

A seat slide apparatus for a vehicle comprising a lower rail assembled to a vehicle seat, an upper rail slidably engaging with the corresponding upper rail for supporting the vehicle seat, a loop-shaped release handle supported by the upper rail on its end portion for releasing the engagement between the upper rail and the lower rail, and a bracket fixed to the upper rail for detachably supporting the release handle, an opening portion formed on the bracket allowing the end portion of the release handle to pass there through, and a flexible tongue formed on the bracket and adapted to be flexibly movable in vertical direction for engaging with a stopper piece provided at the end portion of the release handle. The current invention uses a technical means for detaching the end portion of the release handle from the bracket fixed to the upper rail for supporting the end portion of the release handle.

BRIEF DESCRIPTION OF THE DRAWING FIGURES

The foregoing and additional features and characteristics of the present invention will become more apparent from the following detailed description considered with reference to the accompanying drawing figures in which like reference numerals designat like elements and wherein.

DETAILED DESCRIPTION OF THE INVENTION

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

Figure 1:
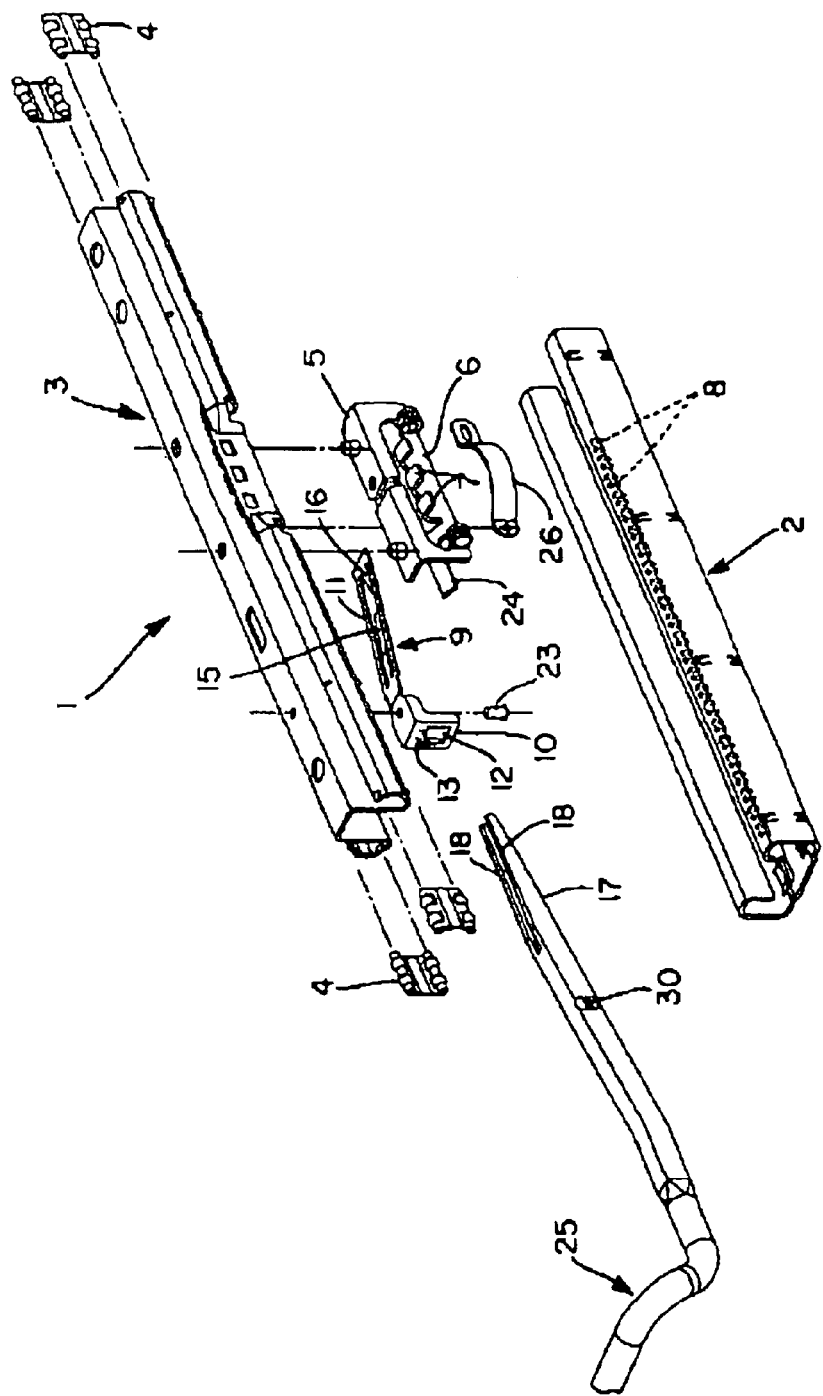
FIG. 1 illustrates a perspective view of an embodiment of the seat slide apparatus for the vehicle according to the invention.
Figure 2:
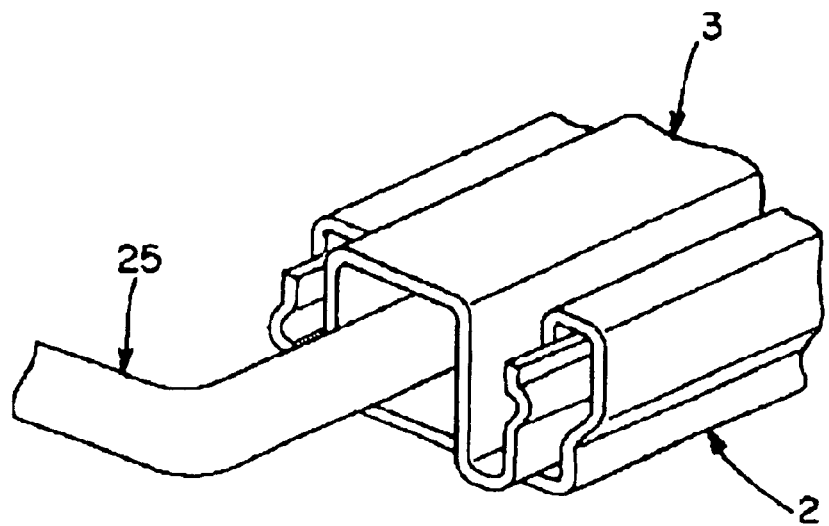
FIG. 2 illustrates a segmentary perspective view which shows the engaging condition between the lower rail and the upper rail.

As shown in FIG. 1, a seat slide apparatus for a vehicle 1 includes a lower rail 2 being an approximately U-shaped form from its cross sectional view and an upper rail 3 being an approximately contra U-shaped form from its cross sectional view. The lower rails 2 are provided away from each other in vehicle width direction and fixed on the vehicle floor. The upper rails 3 are provided being slidable on each lower rails 2 and supporting the vehicle seat (not shown). FIG. 2 shows an engaging condition between the lower rails 2 and the upper rail 3. The upper rail 3 can freely slide on the lower rail 2 through rollers 4.

FIG. 1 shows one configuration of the lower rails 2 and the upper rails 3, in fact, the same configuration as in FIG. 1 is also provided symmetrically on the other side of the seat keeping some distance between each other in vehicle width direction.

A pawl member 6 is rotatably fixed to an L-shaped supporting plate 5 assembled to the top portion of the upper rail 3. Pawls 7 of the pawl member 6 are engagable with a certain portion of plural recess portions 8 on a vertical portion of the lower rail 2. When the pawl 7 becomes engaged from the recess portion 8, the slide movement of the upper rail 3 n the lower rail 2 is stopped. On the other hand, when the pawl 7 becomes disengaged from the recess portion 8, the upper rail 3 adapts to slide on the lower rail 2 within the range that the recesses exist on the lower rail 2. In FIG. 1, three pawls 7 are provided, however, the number of the pawl is not specified.

The pawl member 6 is rotated by a loop-shaped release handle 25 relative to the supporting plate 5.

A bracket 9 being an approximately L-shaped form from its front view is fixed by a screw or a rivet on the top inner side of the upper rail 3. The bracket 9 forms a vertical piece 10 on one end and a horizontal piece 11 on the other end along the upper rail 3 in longitudinal direction of the vehicle, and the vertical piece 10 includes a square opening portion 12 and an elastic piece 13 which projects forwardly from the upper edge of the opening portion 12.

Figure 3:
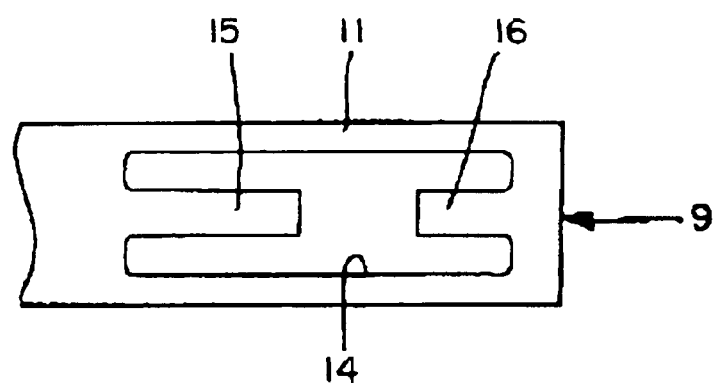
FIG. 3 illustrates a segmentary top view of the horizontal piece of the bracket.
Figure 4:
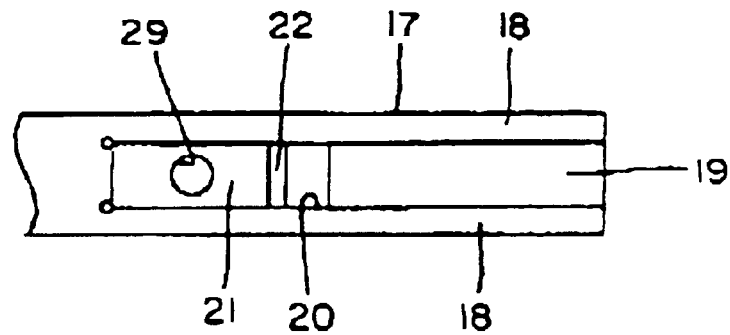
FIG. 4 illustrates a segmentary top view of the end portion of the handle.

As shown in FIG. 3, the horizontal piece 11 includes an H-shaped first punched portion 14, and the punched portion 14 forms a first flexible tongue 15 and a second flexible tongue 16 being adapted to be flexibly movable in vertical direction. The second flexible tongue 16 extends slightly downward.

The loop-shaped release handle 25 includes a pipe, and an end portion 17 of the pipe is press-molded for forming vertical portions 18 and a base portion 19 (FIG. 14). A flange portion 22 (hook portion) is formed as follows. First, a stopper piece 21 is formed by providing a U-shaped second punched portion 20 on the base portion 19 or making a slit on a certain part of the base portion 19 for forming a flake-shaped portion and raising the flake-shaped portion. Then the end portion of the stopper piece 21 is bended upwardly for forming the flange portion 22. In this way, the flange portion 22 (hook portion) is formed.

The base portion 19 of the end portion 17 of the loop-shaped release handle 25 faces to an engaging piece 24 of the pawl member 6, so that when the loop-shaped release handle 25 is lifted, the engaging piece 24 is pressed down, the pawl member 6 is rotated, as a result, the pawl 7 disengages from the recess portion 8.

The loop-shaped release handle 25 pivots in vertical direction via the opening portion 12 of the bracket 9, and the first flexible tongue 15 and the stopper piece 21 integrally move in vertical direction within a stroke range of the loop-shaped release handle 25 by an engagement between the flange portion 22 and the end portion of the first flexible tongue 15. In other words, the end portion 17 of the loop-shaped release handle 25 is supported by the bracket 9 assembled to the upper rail 3 setting the opening portion 12 and the first flexible tongue 15 as supporting points.

As shown in FIG. 1, a leaf spring 26 applies biasing force to the pawl member 6 in direction that the pawl 7 engages with the recess portion 8.

If there is a need to replace one of the upper rails 3 due to some reason (e.g. damages), the replacing procedure is as follows. A working rod 28 is inserted through a working hole 27 on the base portion of the lower rail 2, and the top edge of the working rod 28 engages with the undersurface of the first flexible tongue 15 through a through hole 29 of the stopper piece 21. Then, the working rod 28 is pushed up, and the first flexible tongue 15 is elastically bended in upward direction. Thus, the end portion of the first flexible tongue 15 is unhooked from the flange portion 22 (hook portion), and the first flexible tongue 15 disengages from the stopper piece 21.

The end portion 17 of the loop-shaped release handle 25 can be pulled in front direction of the vehicle in this situation. One end portion of the loop-shaped release handle 25 is pulled out from the opening portion 12, and the upper rail 3 is released from the upper rail 3. In this way, only one upper rail 3 becomes removable from the corresponding lower rail 2 independently of the loop-shaped release handle 25. A whole sub-unit comprised of one upper rail 3 and one lower rail 2 can be removed instead of partial replacement of the rail.

Figure 5:
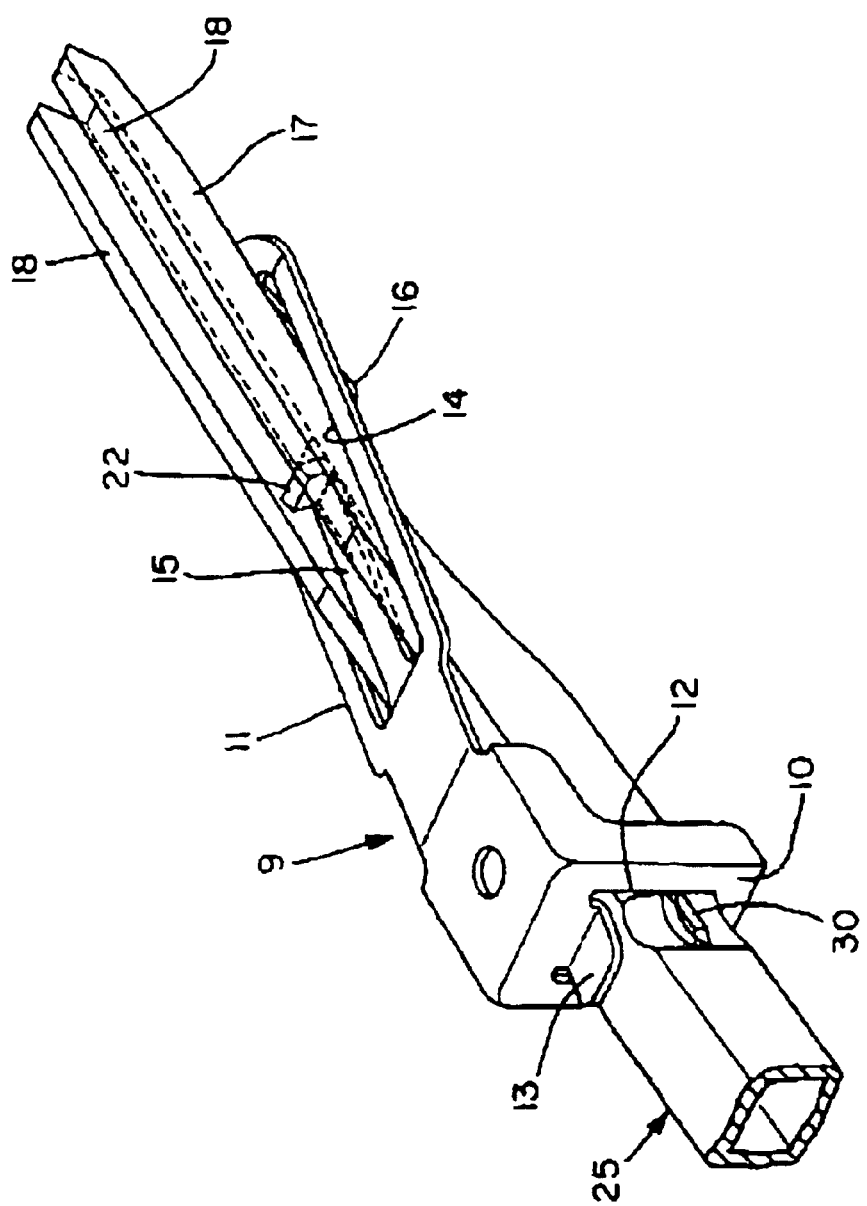
FIG. 5 illustrates a perspective view of the engaging condition between the end portion of the handle and the bracket.
Figure 6:
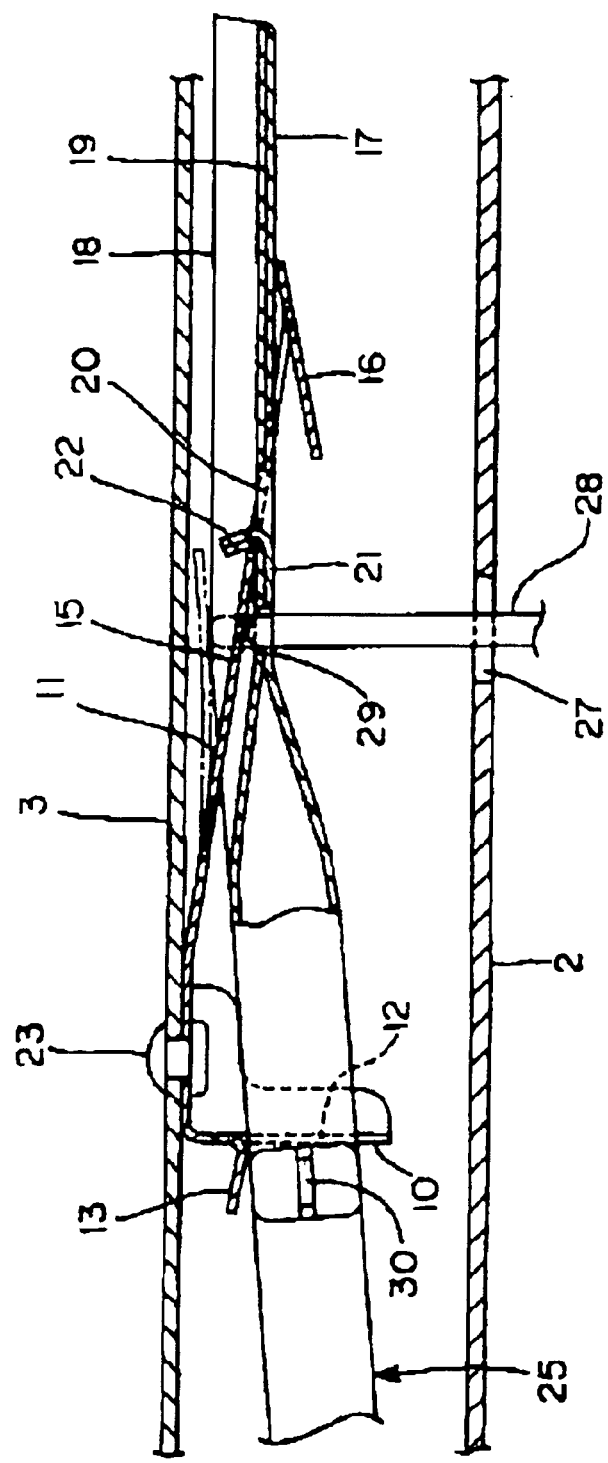
FIG. 6 illustrates a perspective view of the disengaging condition between the end portion of the handle and the bracket.

The loop-shaped release handle 25 engages with the bracket 9 as shown in FIG. 5 and FIG. 6 as follows. The end portion 17 of the loop-shaped release handle 25 passes through the first punched portion 14 of the bracket 9 fixed to the upper rail 3 from the under side of the bracket 9. Then, the flange portion 22 (hook portion) engages with the end of the first flexible tongue 15. The second flexible tongue 16 guides the end portion 17 of the loop-shaped release handle 25 into the first punched portion 14.

In this situation, the elastic piece 13 elastically contacts with the end portion 17 of the loop-shaped release handle 25, in this way, a supporting relationship between the loop-shaped release handle 25 and the bracket 9 is established.

In the assembling condition as shown in FIG. 5 and FIG. 6, the first flexible tongue 15 engages with the flange portion 22 for preventing the loop-shaped release handle 25 from pulling out from the bracket 9 in front direction of the vehicle. The loop-shaped release handle 25 also engages with a projecting portion 30 (stopper portion) on the side of the end portion 17 of the loop-shaped release handle 25 for preventing the loop-shaped release handle 25 from moving in rear direction of the vehicle.

What is claimed is:

1. A seat slide apparatus for a vehicle comprising:
   a lower rail assembled to a vehicle seat;
   an upper rail slidably engaging with the corresponding upper rail for supporting the vehicle seat;
   a loop-shaped release handle supported by the upper rail on its end portion for releasing the engagement between the upper rail and the lower rail;
   a bracket fixed to the upper rail for detachably supporting the release handle;
   an opening portion formed on the bracket allowing the end portion of the release handle to pass there through; and
   a flexible tongue formed on the bracket and adapted to be flexibly movable in vertical direction for engaging with a stopper piece provided at the end portion of the release handle.

2. A seat slide apparatus for a vehicle according to the claim 1, wherein the bracket comprises a vertical piece including the opening portion and a horizontal piece including an H-shaped punched portion for forming the flexible tongue.

3. A seat slide apparatus for a vehicle according to the claim 2, wherein the vertical piece of the bracket includes an elastic piece for holding the release handle.

4. A seat slide apparatus for a vehicle according to the claim 2, wherein the end portion of the release handle includes a second punched portion for forming a stopper piece.

5. A seat slide apparatus for a vehicle according to the claim 4, wherein the end portion of the release handle includes a pair of opposed vertical portions with a distance and a base portion having the stopper piece.

6. A seat slide apparatus for a vehicle according to the claim 5, wherein a flange portion formed on the stopper piece for engaging with an end portion of the flexible tongue becomes disengaged from the end portion of the flexible tongue when the flexible tongue is pushed up.

* * * * *